United States Patent
Nishioka et al.

(10) Patent No.: US 8,827,377 B2
(45) Date of Patent: Sep. 9, 2014

(54) VEHICLE BRAKE DEVICE AND VEHICLE BRAKE DEVICE CONTROL METHOD

(75) Inventors: Takashi Nishioka, Wako (JP); Naoto Ohkubo, Wako (JP); Kunimichi Hatano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 195 days.

(21) Appl. No.: 13/578,423

(22) PCT Filed: Feb. 23, 2011

(86) PCT No.: PCT/JP2011/053929
§ 371 (c)(1),
(2), (4) Date: Aug. 10, 2012

(87) PCT Pub. No.: WO2011/105406
PCT Pub. Date: Sep. 1, 2011

(65) Prior Publication Data
US 2012/0313427 A1    Dec. 13, 2012

(30) Foreign Application Priority Data
Feb. 26, 2010  (JP) .................................. 2010-042929

(51) Int. Cl.
| B60T 8/36 | (2006.01) |
| B60T 8/40 | (2006.01) |
| B60T 7/04 | (2006.01) |
| B60T 13/74 | (2006.01) |
| B60T 13/66 | (2006.01) |

(52) U.S. Cl.
CPC .............. *B60T 7/042* (2013.01); *B60T 8/4081* (2013.01); *B60T 13/745* (2013.01); *B60T 2270/404* (2013.01); *B60T 13/662* (2013.01)
USPC ............ 303/113.1; 303/3; 303/10; 303/113.4

(58) Field of Classification Search
USPC .................. 303/3, 113.1, 113.4, 15, 10, 9.62, 303/119.1; 60/545
See application file for complete search history.

(56) References Cited

U.S. PATENT DOCUMENTS

| 2008/0208426 A1 | 8/2008 | Iwasaki et al. |
| 2008/0210499 A1 | 9/2008 | Isono et al. |
| 2009/0072615 A1 | 3/2009 | Oosawa et al. |
| 2010/0001577 A1* | 1/2010 | Hatano .............................. 303/3 |
| 2010/0090522 A1 | 4/2010 | Bensch et al. |

FOREIGN PATENT DOCUMENTS

| CN | 101254785 A | 9/2008 |
| CN | 101341056 A | 1/2009 |
| CN | 101386295 A | 3/2009 |

(Continued)

*Primary Examiner* — Melanie Torres Williams
(74) *Attorney, Agent, or Firm* — Carrier Blackman & Associates, P.C.; Joseph P. Carrier; Fulchand P. Shende (57) ABSTRACT

In a BBW type brake device, if a slave cylinder becomes inoperable, when a master cylinder is operated for the first time, a master cut valve is opened to charge brake fluid into a reservoir of a hydraulic modulator, and since the brake fluid charged into the reservoir is increased in pressure by driving a hydraulic pump when the master cut valve is closed, wheel cylinders are operated. Since the amount of brake fluid on the downstream side relative to the master cut valve is increased by charging the reservoir with brake fluid, it is possible to increase the pressure of the brake fluid of the reservoir by driving the hydraulic pump and generate brake fluid pressure by a hydraulic modulator that is higher than the brake fluid pressure generated by the master cylinder, thereby generating sufficient braking force without increasing the depressing force applied to a brake pedal.

9 Claims, 12 Drawing Sheets

(56) References Cited

FOREIGN PATENT DOCUMENTS

| | | |
|---|---|---|
| CN | 101568454 A | 10/2009 |
| EP | 1 964 739 A2 | 9/2008 |
| JP | 2007-326395 A | 12/2007 |
| JP | 2010-013069 A | 1/2010 |

* cited by examiner

FIG.3 WHEN BRAKING NORMALLY

FIG.5 WHEN POWER SUPPLY MALFUNCTIONS

FIG.10 — OPERATION OF STEP S13

VEHICLE BRAKE DEVICE AND VEHICLE BRAKE DEVICE CONTROL METHOD

TECHNICAL FIELD

The present invention relates to a so-called BBW (brake by wire) type vehicle brake device that converts a driver's brake pedal operation into an electrical signal and operates a wheel cylinder by means of brake fluid pressure generated by a slave cylinder that is controlled based on the electrical signal, and a control method therefor.

BACKGROUND ART

A BBW type vehicle brake device in which an ABS (antilock brake system), which is formed from a hydraulic pump, an in-valve, an out-valve, and a reservoir, is disposed between a slave cylinder and each wheel cylinder, and when a specific wheel has a tendency to lock while braking is carried out by means of the brake fluid pressure generated by the slave cylinder, ABS control is carried out in which closing the in-valve and opening the out-valve allows the brake fluid pressure to be decreased, closing the in-valve and the out-valve allows the brake fluid pressure to be maintained, and opening the in-valve and closing the out-valve allows the brake fluid pressure to be increased, is known from Patent Document 1 below.

PRIOR ART DOCUMENTS

Patent Documents

Patent Document 1: Japanese Patent Application Laid-open No. 2007-326395

SUMMARY OF THE INVENTION

Problems to be Solved by the Invention

In such a BBW type brake device equipped with a VSA (vehicle stability assist) system between the slave cylinder and the wheel cylinder, when the slave cylinder malfunctions and braking is carried out by means of the brake fluid pressure generated by the master cylinder, increasing the brake fluid pressure of the master cylinder by means of a pressure increase function of the VSA system enables a sufficient level of braking force to be generated in the wheel cylinder while reducing the force necessary for depressing the brake pedal.

However, in the above-mentioned conventional arrangement equipped with the ABS system instead of the VSA system, the hydraulic pump cannot increase the brake fluid pressure supplied from the master cylinder, but only returns the brake fluid stored in the reservoir to the master cylinder side, and there is the problem that the depressing force applied to the brake pedal by the driver in order to ensure a necessary braking force increases.

The present invention has been accomplished in light of the above-mentioned circumstances, and it is an object thereof to increase the brake fluid pressure generated by a hydraulic modulator when a slave cylinder malfunctions so as to carry out braking in a BBW type brake device.

Means for Solving the Problems

In order to attain the above object, according to a first aspect of the present invention, there is provided a vehicle brake device comprising: a master cylinder that is operated by a brake pedal to generate brake fluid pressure, a stroke simulator into which can be introduced brake fluid from the master cylinder, a simulator valve disposed between the master cylinder and the stroke simulator, a fluid path that provides a connection between the master cylinder and a wheel cylinder, a slave cylinder that is connected to the fluid path and generates brake fluid pressure by the driving force of an actuator, a master cut valve that is disposed in the fluid path on an upstream side relative to the slave cylinder and can block the connection between the master cylinder and the wheel cylinder, and a hydraulic modulator that is disposed in the fluid path on a downstream side relative to the slave cylinder, the hydraulic modulator comprising: a hydraulic pump that can increase the pressure of the brake fluid of a reservoir and supply the brake fluid to the fluid path, an in-valve that is disposed between the slave cylinder, the hydraulic pump, and the wheel cylinder, and an out-valve that is disposed between the wheel cylinder and the reservoir, and when there is an abnormality of the slave cylinder, control means closes the simulator valve and opens the master cut valve, the in-valve, and the out-valve to thus enable the brake fluid to be transferred from the master cylinder to the reservoir.

Further, according to a second aspect of the present invention, in addition to the first aspect, the device comprises amount of operation detection means for detecting an amount of operation of the brake pedal, the control means closing the master cut valve when the amount of operation of the brake pedal detected by the amount of operation detection means attains a predetermined value when there is an abnormality of the slave cylinder.

Furthermore, according to a third aspect of the present invention, in addition to the first or second aspect, the in-valve and the out-valve are provided so as to correspond to at least two wheel cylinders, and the control means closes the in-valve and opens the out-valve of one wheel cylinder and opens the in-valve and closes the out-valve of the other wheel cylinder to thus supply the brake fluid of the one wheel cylinder side to the other wheel cylinder side via the hydraulic pump.

Moreover, according to a fourth aspect of the present invention, in addition to the second aspect, the control means opens the simulator valve again after closing the master cut valve.

Further, according to a fifth aspect of the present invention, there is provided a vehicle brake device control method comprising: a master cylinder that is operated by a brake pedal to generate brake fluid pressure, a stroke simulator into which can be introduced brake fluid from the master cylinder, a simulator valve disposed between the master cylinder and the stroke simulator, a fluid path that provides a connection between the master cylinder and a wheel cylinder, a slave cylinder that is connected to the fluid path and generates brake fluid pressure by the driving force of an actuator, a master cut valve that is disposed in the fluid path on an upstream side relative to the slave cylinder and can block the connection between the master cylinder and the wheel cylinder, and a hydraulic modulator that is disposed in the fluid path on a downstream side relative to the slave cylinder, the hydraulic modulator comprising: a hydraulic pump that can increase the pressure of the brake fluid of a reservoir and supply the brake fluid to the fluid path, an in-valve that is disposed between the slave cylinder, the hydraulic pump, and the wheel cylinder, and an out-valve that is disposed between the wheel cylinder and the reservoir, the method comprising: a first step of closing the simulator valve when there is an abnormality of the slave cylinder, a second step of opening the master cut valve, the in-valve, and the out-valve, a third step of closing the master cut valve when an amount of operation of the brake pedal attains a predetermined value, and a fourth step of driving the hydraulic pump to operate the wheel cylinder.

Furthermore, according to a sixth aspect of the present invention, in addition to the fifth aspect, the in-valve and the out-valve each are provided so as to correspond to at least two wheel cylinders, and in the fourth step, the in-valve of one wheel cylinder is closed, the out-valve thereof is opened, the in-valve of the other wheel cylinder is opened, and the out-valve thereof is closed.

Moreover, according to a seventh aspect of the present invention, in addition to the fifth or sixth aspect, in the fourth step the simulator valve is opened again.

First and second master cut valves 32 and 33 of an embodiment correspond to the master cut valve of the present invention, a stroke sensor Sd of the embodiment corresponds to the amount of operation detection means of the present invention, and an electronic control unit U of the embodiment corresponds to the control means of the present invention.

Effects of the Invention

In accordance with the first aspect of the present invention, when the slave cylinder is normal, while opening the simulator valve to thus allow a brake pedal stroke, the master cut valve is closed to thus block the brake fluid pressure from the master cylinder, and the wheel cylinder is operated by means of the brake fluid pressure generated by the slave cylinder. In an abnormal situation when the slave cylinder becomes inoperable, when the master cylinder is operated for the first time, after the reservoir of the hydraulic modulator is charged via the opened master cut valve with the brake fluid fed out by the master cylinder, since the brake fluid charged into the reservoir is increased in pressure by driving the hydraulic pump in a state in which the master cut valve is closed, the increased brake fluid pressure can be transmitted to the wheel cylinder by opening the in-valve and closing the out-valve, and the brake fluid pressure can be decreased by closing the in-valve and opening the out-valve. Since the amount of brake fluid on the downstream side relative to the master cut valve can be increased by charging the reservoir with brake fluid as above, it is possible to increase the pressure of the brake fluid of the reservoir by driving the hydraulic pump of the hydraulic modulator, thus generating sufficient braking force with respect to the force with which the brake pedal is depressed.

Furthermore, in accordance with the second aspect of the present invention, since the amount of operation of the brake pedal is detected by the amount of operation detection means, and the master cut valve is closed when the amount of operation of the brake pedal detected by the amount of operation detection means attains a predetermined value when there is an abnormality of the slave cylinder, not only is it possible to charge the reservoir with a sufficient amount of brake fluid, but it is also possible to prevent the brake fluid from flowing back from the reservoir to the master cylinder side.

Moreover, in accordance with the third aspect of the present invention, since the in-valve and the out-valve of the hydraulic modulator are provided so as to correspond to at least two wheel cylinders, closing the in-valve and opening the out-valve of one wheel cylinder allows the brake fluid pressure to be released to the reservoir, thus decreasing the pressure, and opening the in-valve and closing the out-valve of the other wheel cylinder enables the brake fluid pressure to be increased by the hydraulic pump, thereby generating different braking force in the two wheel cylinders.

Furthermore, in accordance with the fourth aspect of the present invention, since the simulator valve is opened again after the master cut valve is closed, it is possible to eliminate any disagreeable sensation for the driver by enabling brake pedal stroke during braking by means of the hydraulic modulator.

Moreover, in accordance with the fifth aspect of the present invention, in the first step the simulator valve is closed when there is an abnormality of the slave cylinder, in the second step the reservoir can be charged with brake fluid by means of the brake fluid pressure generated by the master cylinder in a state in which the master cut valve, the in-valve, and the out-valve are opened, in the third step when the amount of operation of the brake pedal attains a predetermined value the master cut valve is closed, and in the fourth step the hydraulic pump is driven to thus operate the wheel cylinder. The amount of brake fluid on the downstream side relative to the master cut valve is increased by charging the reservoir with brake fluid as above, and it thus becomes possible to increase the pressure of the brake fluid of the reservoir by driving the hydraulic pump, thereby enabling a sufficient braking force to be generated with respect to the force with which the brake pedal is depressed. The increased brake fluid pressure can be transmitted to the wheel cylinder by opening the in-valve and closing the out-valve, and the brake fluid pressure can be decreased by closing the in-valve and opening the out-valve.

Furthermore, in accordance with the sixth aspect of the present invention, since the in-valve and the out-valve are provided so as to correspond to at least two wheel cylinders, in the fourth step closing the in-valve and opening the out-valve of one wheel cylinder allows the brake fluid pressure to be released to the reservoir, thus decreasing the pressure, and opening the in-valve and closing the out-valve of the other wheel cylinder enables the brake fluid pressure to be increased by the hydraulic pump, thereby generating different braking force in the two wheel cylinders.

Moreover, in accordance with the seventh aspect of the present invention, since the simulator valve is opened again in the fourth step, it is possible to eliminate any disagreeable sensation for the driver by enabling brake pedal stroke during braking by means of the hydraulic modulator.

EXPLANATION OF REFERENCE NUMERALS AND SYMBOLS

11 Master cylinder
12 Brake pedal
23 Hydraulic modulator
26, 27 Wheel cylinder
30, 31 Wheel cylinder
32 First master cut valve (master cut valve)
33 Second master cut valve (master cut valve)
34 Simulator valve
35 Stroke simulator
42 Slave cylinder
43 Actuator
52 In-valve
53 Reservoir
54 Out-valve
55 Hydraulic pump
Pa to Pd Fluid path
Qa to Qd Fluid path
Sd Stroke sensor (amount of operation detection means)
U Electronic control unit (control means)

MODE FOR CARRYING OUT THE INVENTION

A mode for carrying out the present invention is explained below by reference to FIG. 1 to FIG. 12.

First Embodiment

Figure 1:
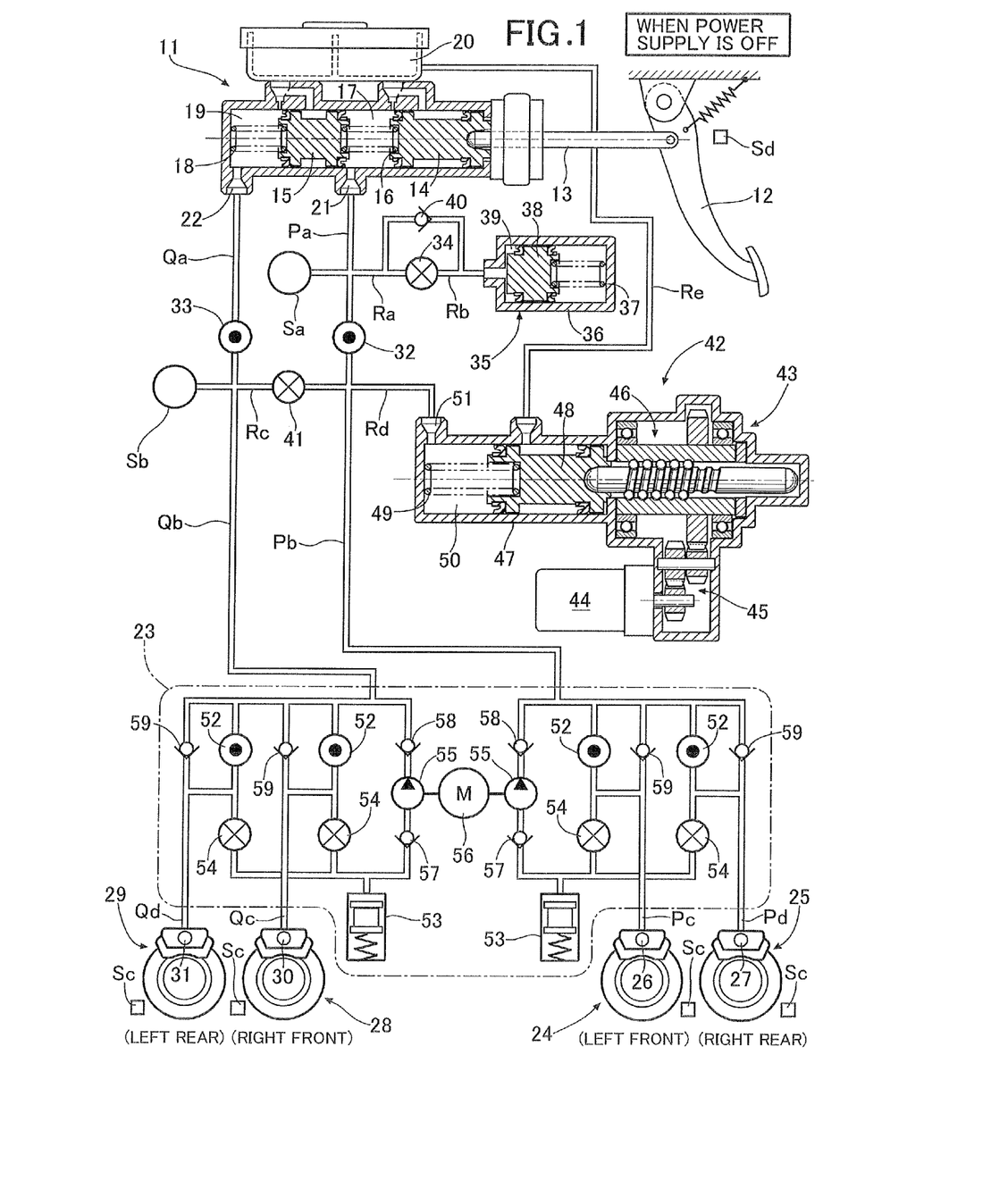
FIG. 1 is a fluid pressure circuit diagram (when a power supply is OFF) of a vehicle brake device. (first embodiment)

As shown in FIG. 1, a tandem type master cylinder 11 includes a first piston 14 and a second piston 15 disposed in front thereof, the first piston 14 being connected via a push rod 13 to a brake pedal 12 operated by a driver, a first fluid pressure chamber 17 housing a return spring 16 is defined between the first piston 14 and the second piston 15, and a second fluid pressure chamber 19 housing a return spring 18 is defined in front of the second piston 15. The first fluid pressure chamber 17 and the second fluid pressure chamber 19, which can communicate with a reservoir 20, include a first output port 21 and a second output port 22 respectively, the first output port 21 being connected to for example wheel cylinders 26 and 27 (first line) of disk brake devices 24 and 25 of a left front wheel and a right rear wheel via a fluid path Pa, a fluid path Pb, a hydraulic modulator 23, and fluid paths Pc and Pd, and the second output port 22 being connected to for example wheel cylinders 30 and 31 (second line) of disk brake devices 28 and 29 of a right front wheel and a left rear wheel via a fluid path Qa, a fluid path Qb, the hydraulic modulator 23, and fluid paths Qc and Qd.

In this specification, the upstream side of the fluid paths Pa to Pd and the fluid paths Qa to Qd means the master cylinder 11 side, and the downstream side means the wheel cylinder 26 and 27; 30 and 31 side.

A first master cut valve 32, which is a normally open electromagnetic valve, is disposed between the fluid paths Pa and Pb, and a second master cut valve 33, which is a normally open electromagnetic valve, is disposed between the fluid paths Qa and Qb. Connected via a simulator valve 34, which is a normally closed electromagnetic valve, to fluid paths Ra and Rb that branch from the fluid path Pa on the upstream side of the first master cut valve 32 is a stroke simulator 35. The stroke simulator 35 is formed by slidably fitting into a cylinder 36 a piston 38 urged by a spring 37, and a fluid pressure chamber 39 formed on the side of the piston 38 opposite to the spring 37 communicates with the fluid path Rb. Connected in parallel to the simulator valve 34 is a check valve 40 that only permits brake fluid to flow from the stroke simulator 35 side to the fluid path Pa side.

A communication control valve 41, which is a normally closed electromagnetic valve, is disposed in a third fluid path Rc that connects the fluid path Pb and the fluid path Qb to each other on the downstream side of the first and second master cut valves 32 and 33, and a slave cylinder 42 is connected to a fluid path Rd branching from the fluid path Pb. An actuator 43 for operating the slave cylinder 42 transmits rotation of an electric motor 44 to a ball screw mechanism 46 via a gear train 45. The slave cylinder 42 includes a cylinder main body 47 that is connected to the reservoir 20 of the master cylinder 11 via a fluid path Re, and a piston 48 that is slidably fitted into the cylinder main body 47 is urged by a return spring 49 in the backward direction. When the piston 48 is driven by the ball screw mechanism 46 of the actuator 43 in the forward direction, brake fluid pressure generated in a fluid pressure chamber 50 is transmitted to the fluid path Rd via an output port 51.

The structure of the hydraulic modulator 23, which is provided with an ABS (antilock brake system) function, is known, and the same structure is employed for the line of the disk brake devices 24 and 25 of the left front wheel and the right rear wheel and the line of the disk brake devices 28 and 29 of the right front wheel and the left rear wheel. The line of the disk brake devices 24 and 25 of the left front wheel and the right rear wheel is explained as being representative thereof; in-valves 52 and 52, which are a pair of normally open electromagnetic valves, are disposed between the fluid path Pb and the fluid paths Pc and Pd, and out-valves 54 and 54, which are normally closed electromagnetic valves, are disposed between a reservoir 53 and the fluid paths Pc and Pd on the downstream side of the in-valves 52 and 52. A hydraulic pump 55 is disposed between the reservoir 53 and the fluid path Pb, this hydraulic pump 55 being driven by an electric motor 56.

Check valves 57 and 58, which only permit brake fluid to flow from the reservoir 53 side to the fluid paths Pb and Qb side, are disposed on the intake side and the discharge side of each hydraulic pump 55. Furthermore, check valves 59, which only permit brake fluid to flow from the fluid paths Pc and Pd; Qc and Qd side to the fluid paths Pb and Qb side, are connected in parallel to each in-valve 62.

Figure 2:
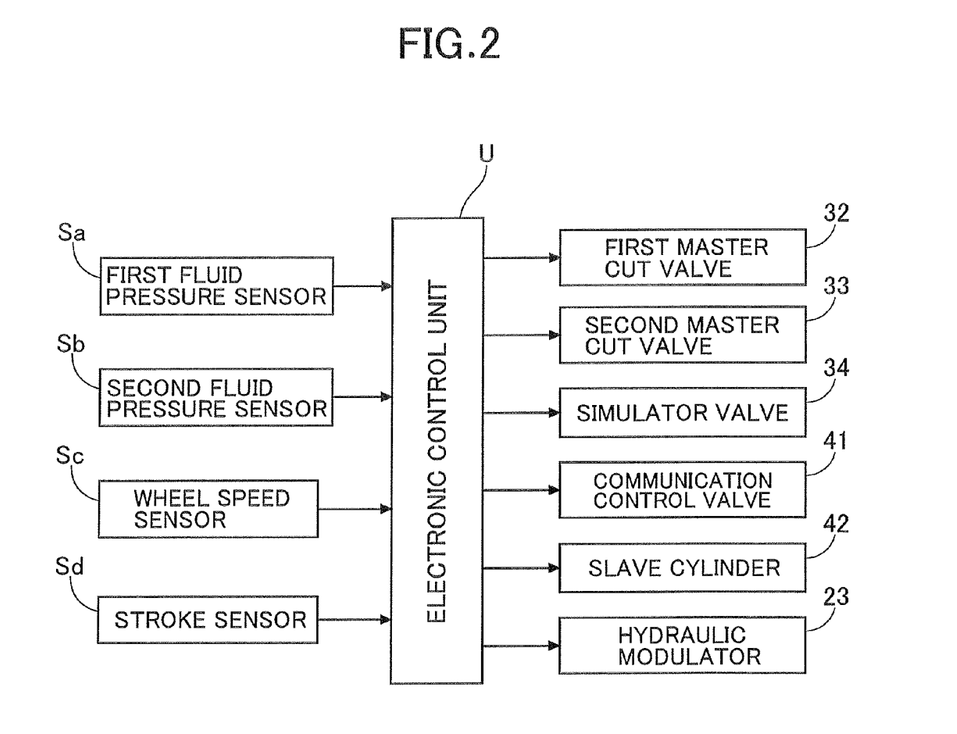
FIG. 2 is a block diagram of a control system. (first embodiment)

As shown in FIG. 1 and FIG. 2, connected to the fluid path Pa is a first fluid pressure sensor Sa for detecting the fluid pressure thereof, and connected to the fluid path Qb is a second fluid pressure sensor Sb for detecting the fluid pressure thereof. The first fluid pressure sensor Sa, the second fluid pressure sensor Sb, wheel speed sensors Sc for detecting the wheel speed of each wheel, and a stroke sensor Sd for detecting the stroke of the brake pedal 12 are connected to an electronic control unit U that is connected to the first and second master cut valves 32 and 33, the simulator valve 34, the communication control valve 41, the slave cylinder 42, and the hydraulic modulator 23.

The operation of the mode for carrying out the present invention having the above-mentioned arrangement is now explained.

First, normal braking operation in a normal situation is explained by reference to FIG. 3.

In a normal situation when the system is functioning normally, when the first fluid pressure sensor Sa provided in the fluid path Pa detects the brake pedal 12 being depressed by the driver, the first and second master cut valves 32 and 33, which are normally open electromagnetic valves, are energized and thus close, the simulator valve 34, which is a normally closed electromagnetic valve, is energized and thus opens, and the communication control valve 41, which is a normally closed electromagnetic valve, is energized and thus opens. At the same time as the above, the actuator 43 of the slave cylinder 42 operates and the piston 48 moves forward, thereby generating a brake fluid pressure in the fluid pressure chamber 50. Since at this time the communication control valve 41, which is a normally closed electromagnetic valve, is energized and thus opens, the brake fluid pressure generated by the slave cylinder 42 is transmitted to the fluid path Pb and the fluid path Qb connected to the fluid path Pb via the third fluid path Rc, and transmitted from the two fluid paths Pb and Qb to the wheel cylinders 26 and 27; 30 and 31 of the disk brake devices 24 and 25; 28 and 29 via the opened in-valves 52 of the hydraulic modulator 23, thus braking each wheel.

Furthermore, the brake fluid pressure generated by the first fluid pressure chamber 17 of the master cylinder 11 is transmitted to the fluid pressure chamber 39 of the stroke simulator 35 via the opened simulator valve 34 to move the piston 38 against the spring 37, thus allowing a stroke of the brake pedal 12 and generating a simulated pedal reaction force to eliminate any disagreeable sensation for the driver. In this process, it is also possible to employ an arrangement in which the brake fluid pressure is controlled based on the amount detected by the stroke sensor Sd instead of the first fluid pressure sensor Sa.

Controlling the operation of the actuator 43 of the slave cylinder 42 so that the brake fluid pressure due to the slave cylinder 42 detected by the fluid pressure sensor Sb provided in the fluid path Qb has a magnitude corresponding to the brake fluid pressure due to the master cylinder 11 detected by the fluid pressure sensor Sa provided in the fluid path Pa enables a braking force corresponding to the depressing force inputted by the driver into the brake pedal 12 to be generated in the disk brake devices 24 and 25; 28 and 29.

Furthermore, when the brake fluid pressure transmitted to the wheel cylinders 26 and 27 of the first line and the brake fluid pressure transmitted to the wheel cylinders 30 and 31 of the second line are made different from each other, opening the communication control valve 41 having a variable degree of opening to any intermediate degree of opening may enable the fluid pressure of the fluid path Qb to be decreased relative to the fluid pressure of the fluid path Pb.

The operation of ABS control in a normal situation is now explained by reference to FIG. 4.

During the above-mentioned braking in a normal situation, when based on the output of the wheel speed sensors Sc it is detected that the slip rate of a wheel has increased and there is a tendency for it to lock, the operating state of the slave cylinder 42 is maintained, and in this state the hydraulic modulator 23 is operated to thus prevent the wheel from locking That is, when there is a tendency for the predetermined wheel to lock, in a state in which the in-valve 52 communicating with the wheel cylinder of the disk brake device of the wheel is closed and transmission of brake fluid pressure from the slave cylinder 42 is blocked, a pressure decrease operation in which the out-valve 54 is opened to thus release the brake fluid pressure of the wheel cylinder to the reservoir 53 and subsequently a maintenance operation in which the out-valve 54 is closed to thus maintain the brake fluid pressure of the wheel cylinder are carried out, thus decreasing the braking force so that the wheel does not lock.

If, as a result, the wheel speed recovers and the slip rate decreases, a pressure increase operation in which the in-valve 52 is opened to thus increase the brake fluid pressure of the wheel cylinder is carried out, thereby increasing the braking force on the wheel. If the wheel again has a tendency to lock due to this pressure increase operation, the above-mentioned pressure decrease, maintenance, and pressure increase are carried out again, and repeating them enables the maximum braking force to be generated while suppressing locking of the wheel. In this process, brake fluid that has flowed into the reservoir 53 is returned to the fluid paths Pb and Qb on the upstream side by means of the hydraulic pump 55.

Figure 4:
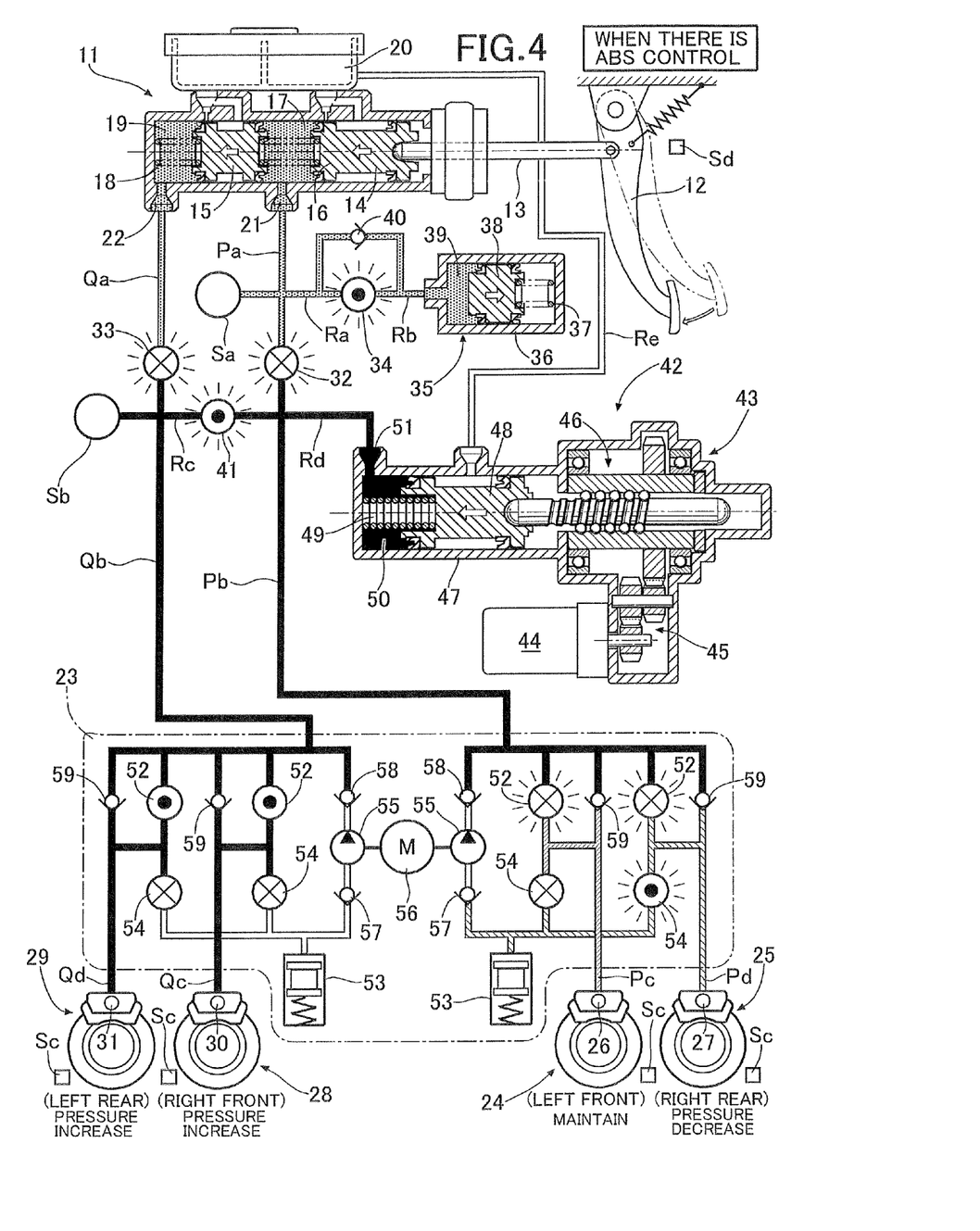
FIG. 4 is a diagram for explaining the operation when there is ABS control. (first embodiment)

FIG. 4 shows a state in which the brake fluid pressure of the wheel cylinder 26 of the left front wheel is maintained, the brake fluid pressure of the wheel cylinder 27 of the right rear wheel is decreased, and the brake fluid pressure of the wheel cylinders 30 and 31 of the right front wheel and the left rear wheel is increased.

Figure 5:
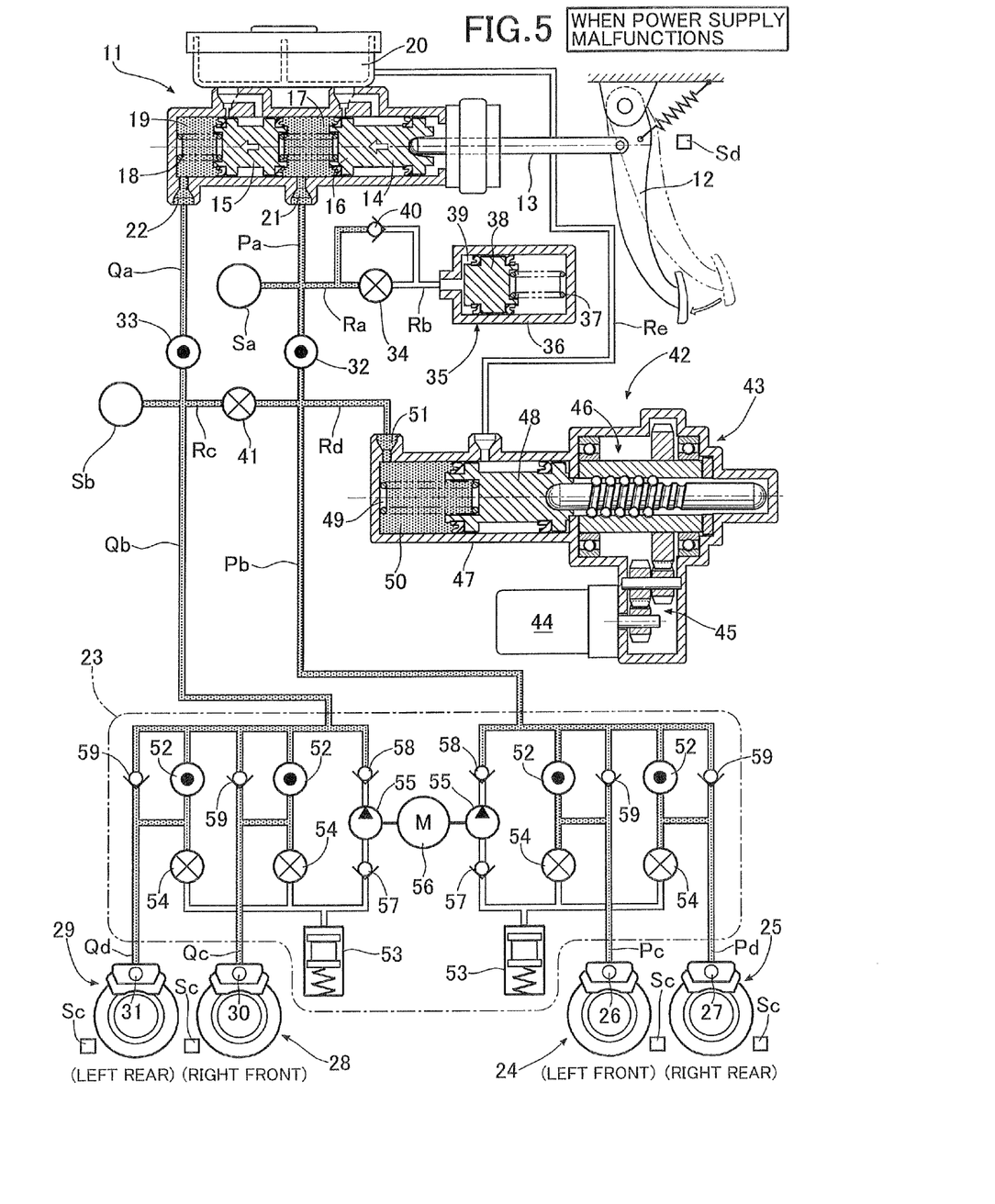
FIG. 5 is a diagram for explaining the operation when there is a malfunction of the power supply. (first embodiment)

The braking operation when the power supply malfunctions is now explained by reference to FIG. 5.

When the power supply malfunctions, the first and second master cut valves 32 and 33, which are normally open electromagnetic valves, automatically open, the simulator valve 34 and the communication control valve 41, which are normally closed electromagnetic valves, automatically close, the in-valves 52, which are normally open electromagnetic valves, automatically open, and the out-valves 54, which are normally closed electromagnetic valves, automatically close. In this state, the brake fluid pressure generated in the first and second fluid pressure chambers 17 and 19 of the master cylinder 11 passes through the first and second master cut valves 32 and 33 and the in-valves 52 without being absorbed by the stroke simulator 35, to thus operate the wheel cylinders 26 and 27; 30 and 31 of the disk brake devices 24 and 25; 30 and 31 of the wheels, and a braking force can be generated without problem.

In this process, if the brake fluid pressure generated by the master cylinder 11 acts on the fluid pressure chamber 50 of the slave cylinder 42 and makes the piston 48 move backward, there is a possibility that the volume of the fluid pressure chamber 50 will expand and the brake fluid pressure will decrease; if an attempt is made to maintain the brake fluid pressure the stroke of the brake pedal 12 will increase. However, in accordance with the present embodiment, since the ball screw mechanism 46 of the slave cylinder 42 suppresses backward movement if a load from the piston 48 side is inputted, any increase in the volume of the fluid pressure chamber 50 is suppressed.

Furthermore, when the power supply malfunctions, since the communication control valve 41 is closed, the fluid paths Pa to Pd of the first line and the fluid paths Qa to Qd of the second line are completely separated; even if the fluid path of one line suffers from a liquid leakage malfunction, the braking force of the other line can be maintained, and redundancy can be further enhanced.

If the power supply malfunctions in a state in which the brake pedal 12 is depressed, the simulator valve 34, which is a normally closed electromagnetic valve, automatically closes to trap the brake fluid in the stroke simulator 35; there is a possibility that the volume of brake fluid will become insufficient, but since in such a case the brake fluid of the stroke simulator 35 passes through the check valve 40 and is returned to the master cylinder 11 side, no problem occurs.

Figure 6:
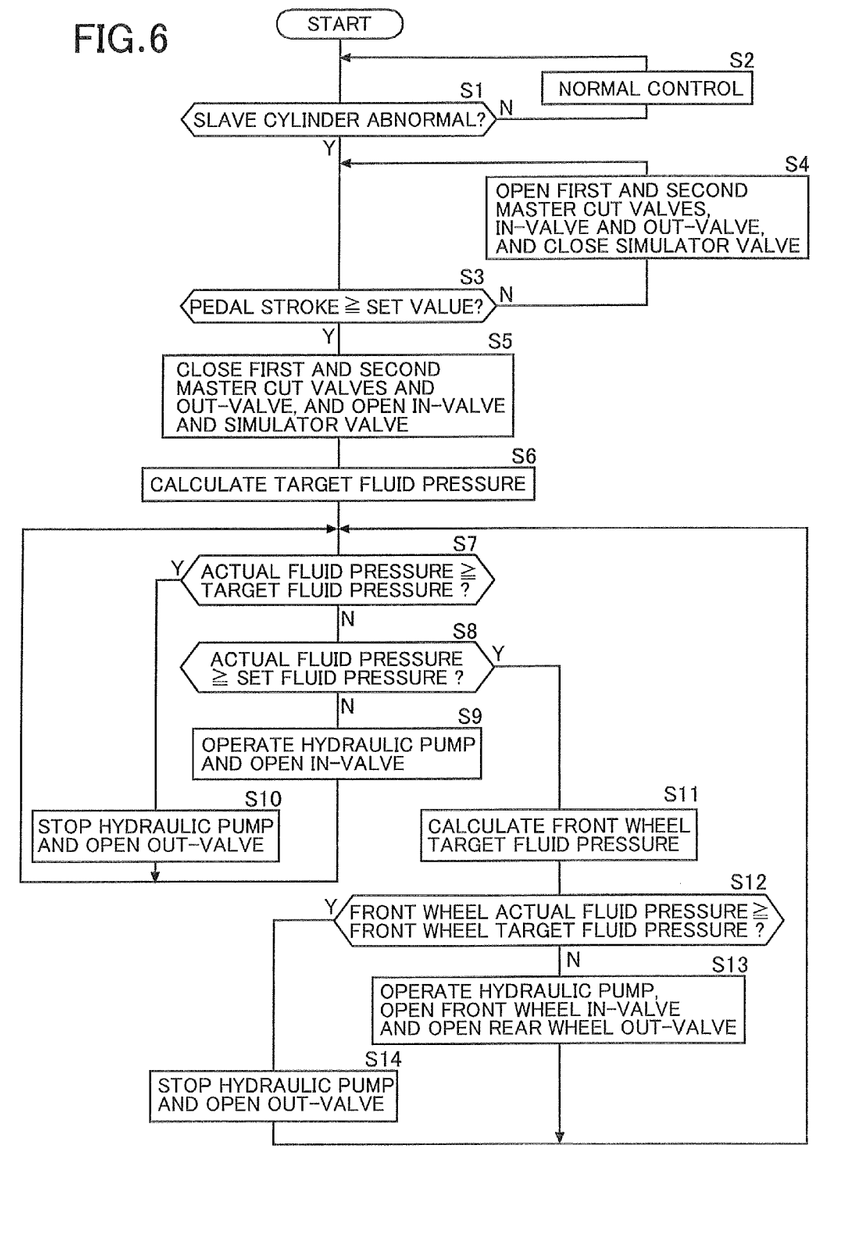
FIG. 6 is a flowchart for explaining the operation when a slave cylinder malfunctions. (first embodiment)
Figure 7:
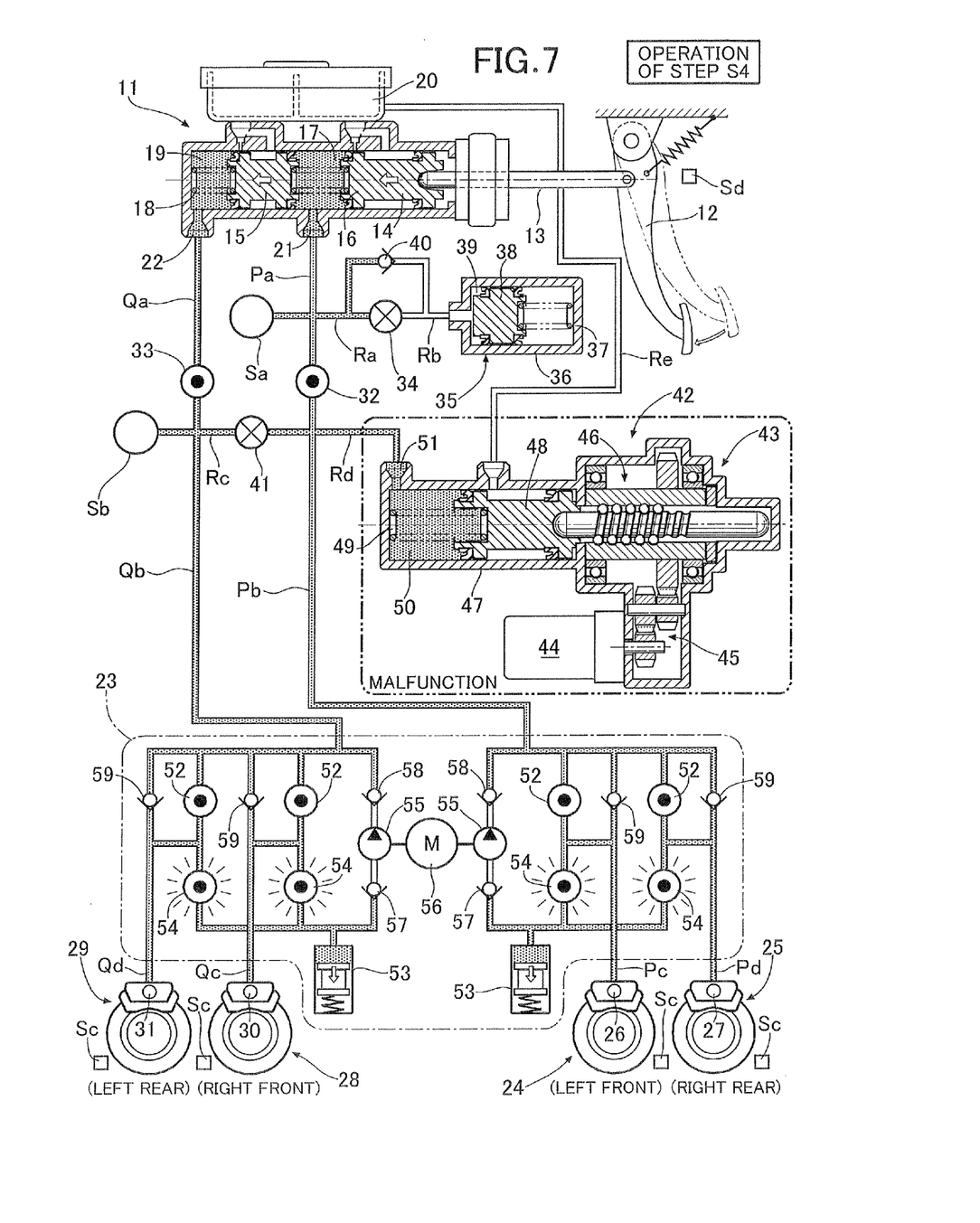
FIG. 7 is a diagram showing a fluid pressure circuit corresponding to step S4. (first embodiment)
Figure 8:
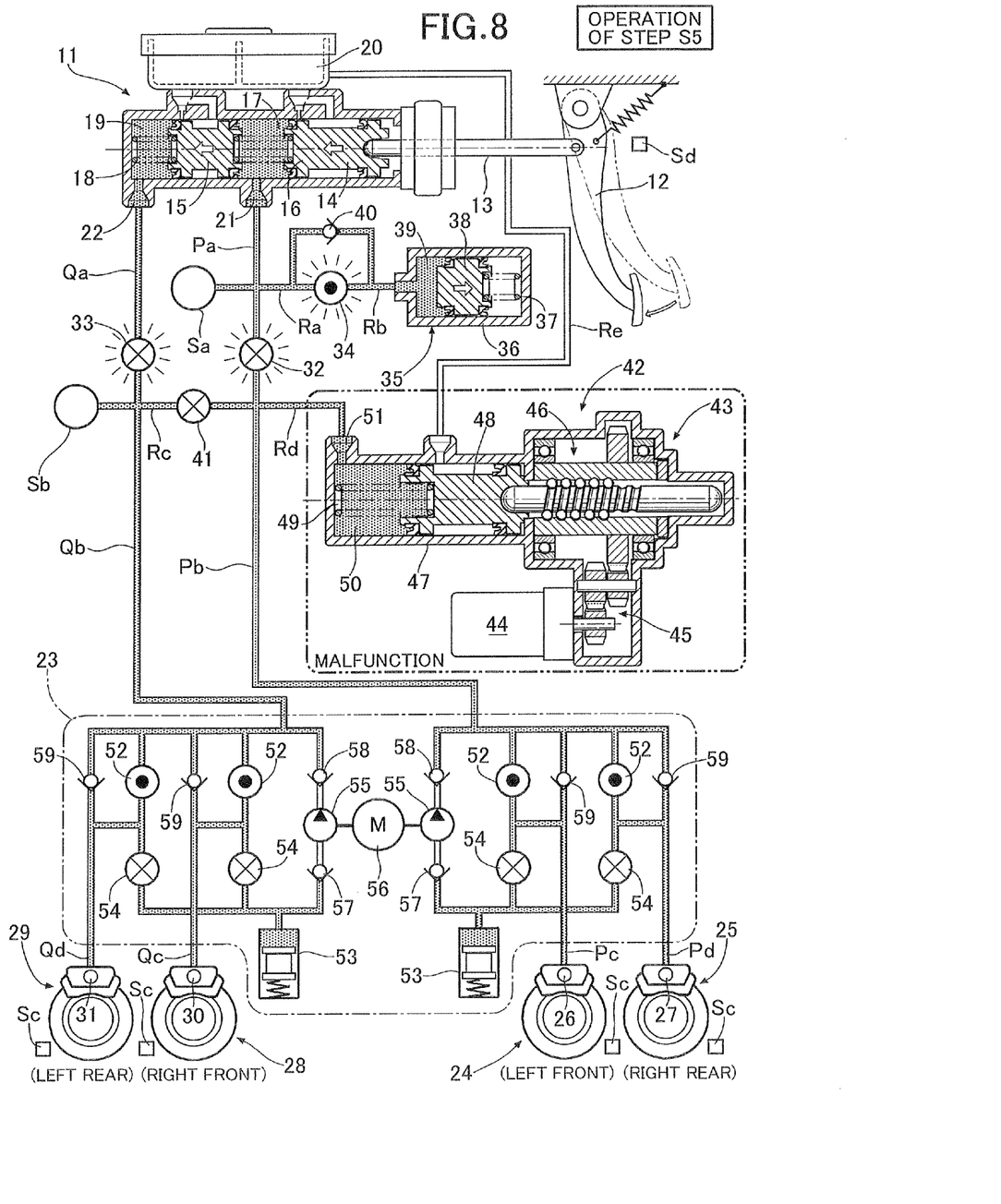
FIG. 8 is a diagram showing the fluid pressure circuit corresponding to step S5. (first embodiment)
Figure 9:
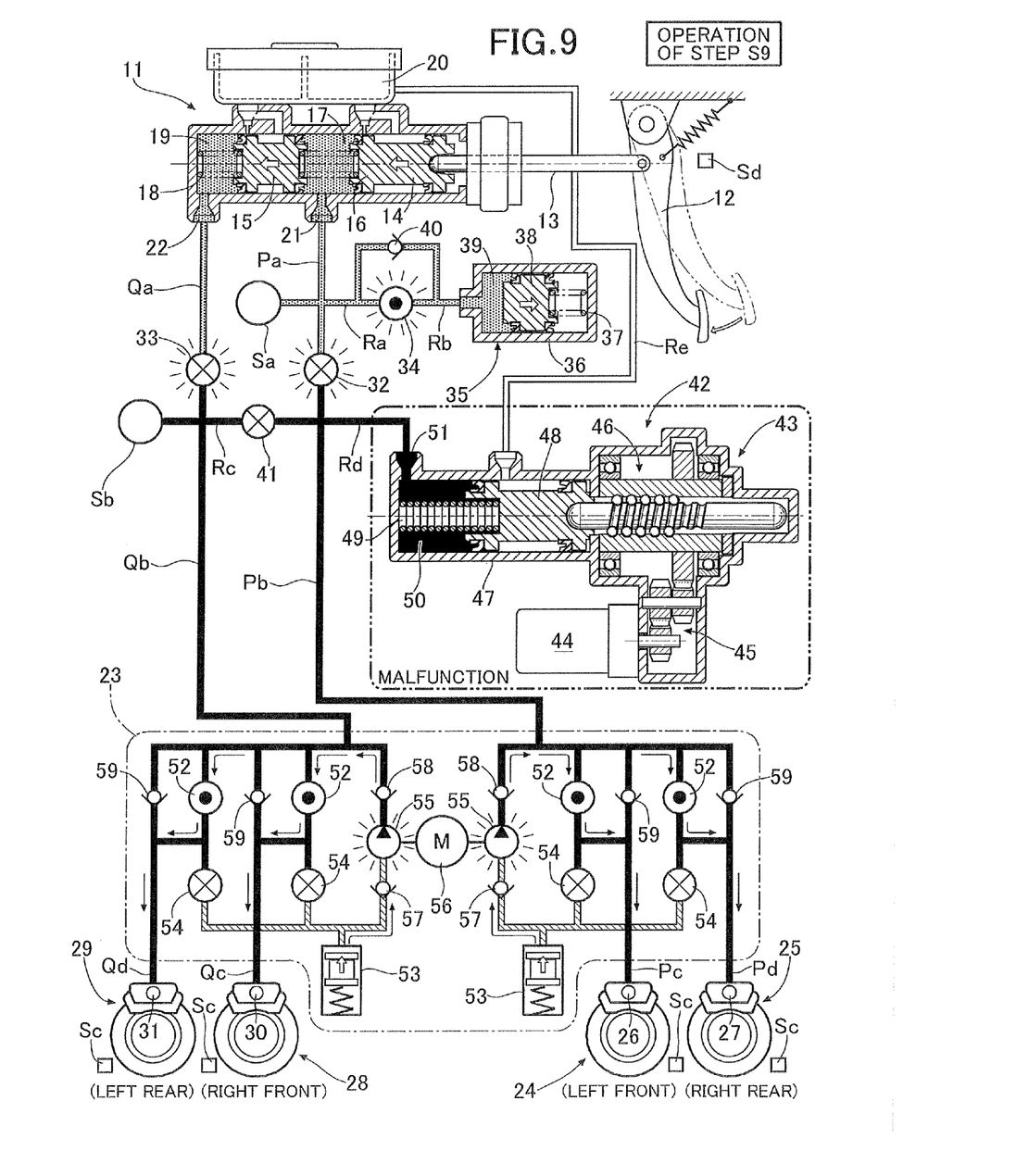
FIG. 9 is a diagram showing the fluid pressure circuit corresponding to step S9. (first embodiment)

The operation when the slave cylinder 42 becomes inoperable due to failure of the actuator 43, seizure of the piston 48, etc. is explained by reference to the flowchart of FIG. 6.

Figure 3:
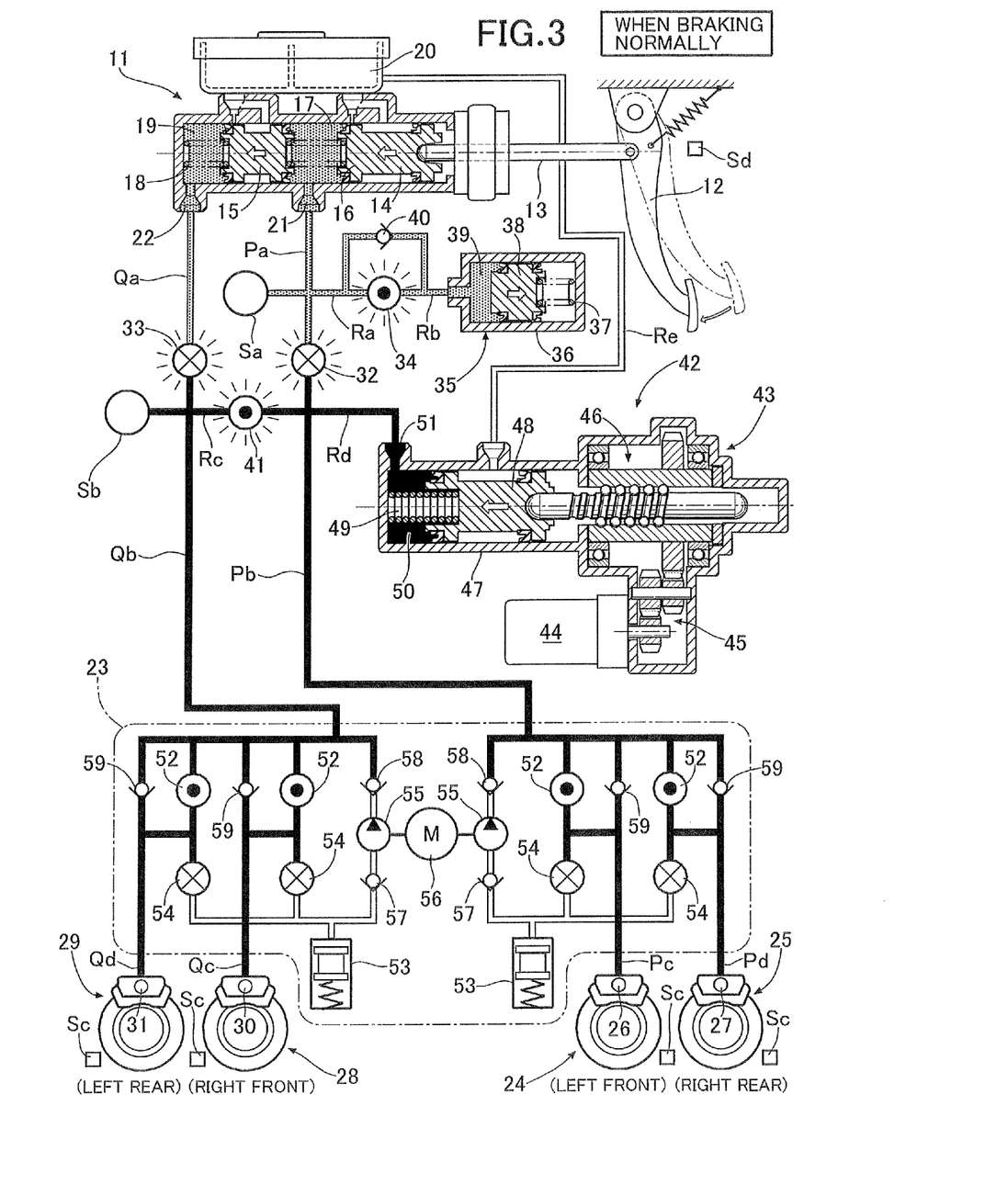
FIG. 3 is a diagram for explaining the operation when braking normally. (first embodiment)

First, if in step S1 the slave cylinder 42 is normal, in step S2 control for when the situation is normal, which is explained by reference to FIG. 3 and FIG. 4, is carried out.

If in step S1 above the slave cylinder 42 becomes inoperable due to the above-mentioned abnormality occurring, the communication control valve 41 is closed. Subsequently, when the brake pedal 12 is depressed for the first time, until the stroke of the brake pedal 12 detected by the stroke sensor Sd attains a predetermined value or greater in step S3, in step S4 the first and second master cut valves 32 and 33 and the in-valves 52 and the out-valves 54 of the hydraulic modulator 23 are opened, and the simulator valve 34 is closed. As a result, the brake fluid fed out by the master cylinder 11 passes the opened first and second master cut valves 32 and 33, in-valves 52, and out-valves 54 without being absorbed by the stroke simulator 35 and is charged into the reservoirs 53 and 53 of the hydraulic modulator 23 (see FIG. 7). At least one per line of the out-valves 54 may be opened.

When the brake pedal 12 is depressed next time or thereafter, since the simulator valve 34 is opened although the first and second master cut valves 32 and 33 are closed, there is a stroke of the brake pedal 12, and the brake fluid pressure generated in the first fluid path Pa is detected by the first fluid pressure sensor Sa. Therefore, in step S6 the brake fluid pressure (master cylinder fluid pressure) detected by the first fluid pressure sensor Sa is used to set a target fluid pressure that is higher than this pressure (see FIG. 11).

If in the subsequent step S7 the actual fluid pressure detected by the second fluid pressure sensor Sb is less than the target fluid pressure and in step S8 the actual fluid pressure is less than a set fluid pressure that is smaller than the target fluid pressure, then in step S9 the hydraulic pumps 55 and 55 are operated to increase the pressure of the brake fluid within the reservoirs 53 and 53 and supply it to the wheel cylinders 26 and 27; 30 and 31 via the in-valves 52. In this way, increasing the pressure of the brake fluid charged in advance into the reservoirs 53 and 53 by means of the hydraulic pump 55 allows the hydraulic modulator 23, which does not inherently have a pressure increase function, to exhibit a pressure increase function, thereby enabling braking with high deceleration to be carried out by supplying to the wheel cylinders 26 and 27; 30 and 31 a large brake fluid pressure with respect to the force with which the brake pedal 12 is depressed (see FIG. 9).

In step S7 when the actual fluid pressure attains the target fluid pressure or greater, since further pressure increase becomes unnecessary, in step S10 the hydraulic pump 55 is stopped, and the out-valves 54 are opened as necessary, thus releasing the brake fluid pressure of the wheel cylinders 26 and 27; 30 and 31 to the reservoirs 53 and 53.

If in step S8 above the actual fluid pressure is the set fluid pressure or greater, setting the braking force for the front wheel, which has a large brake factor, so as to be larger than the braking force of the rear wheel, which has a small brake factor, enables more efficient braking to be carried out.

Figure 10:
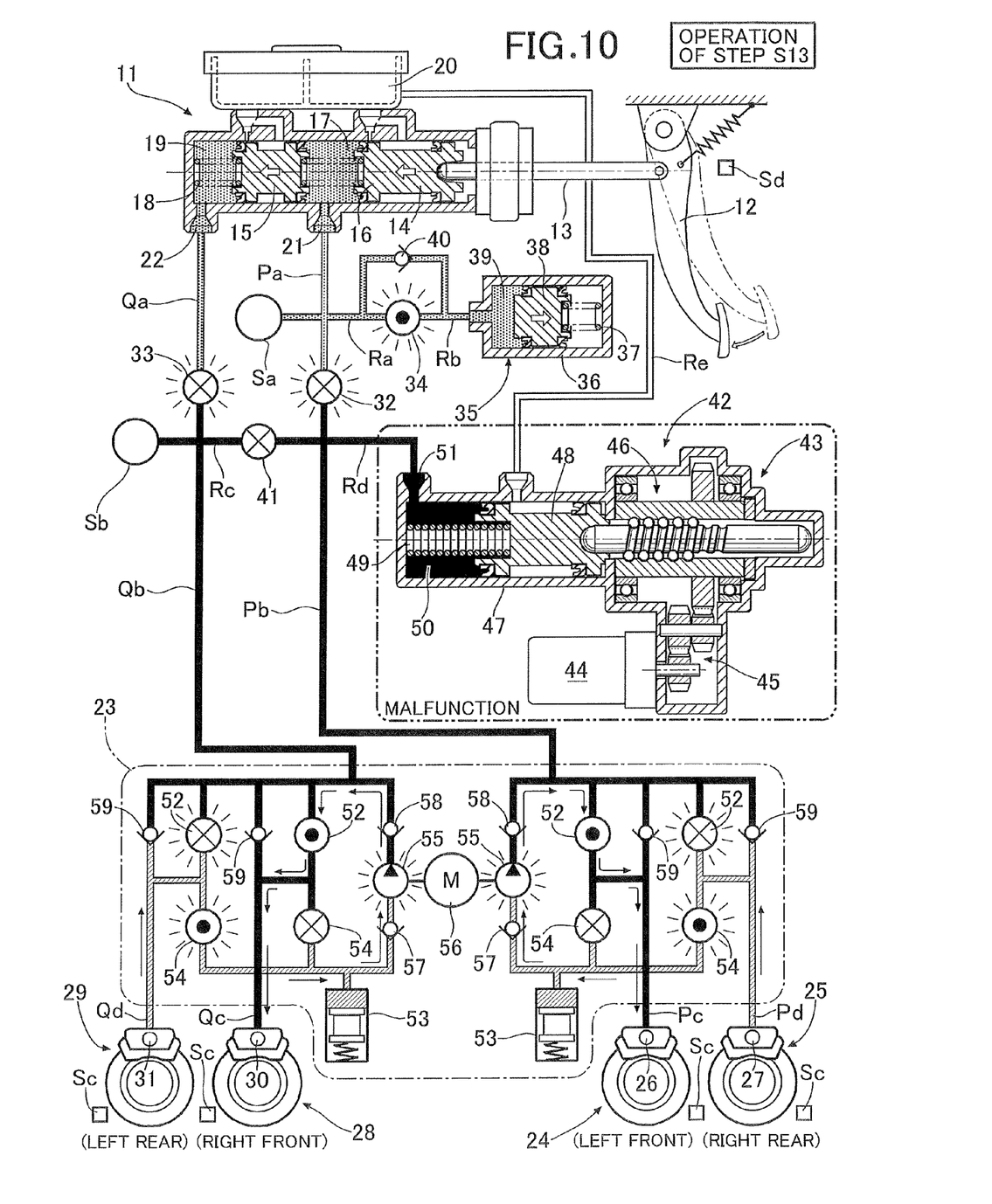
FIG. 10 is a diagram showing the fluid pressure circuit corresponding to step S13. (first embodiment)
Figure 11:
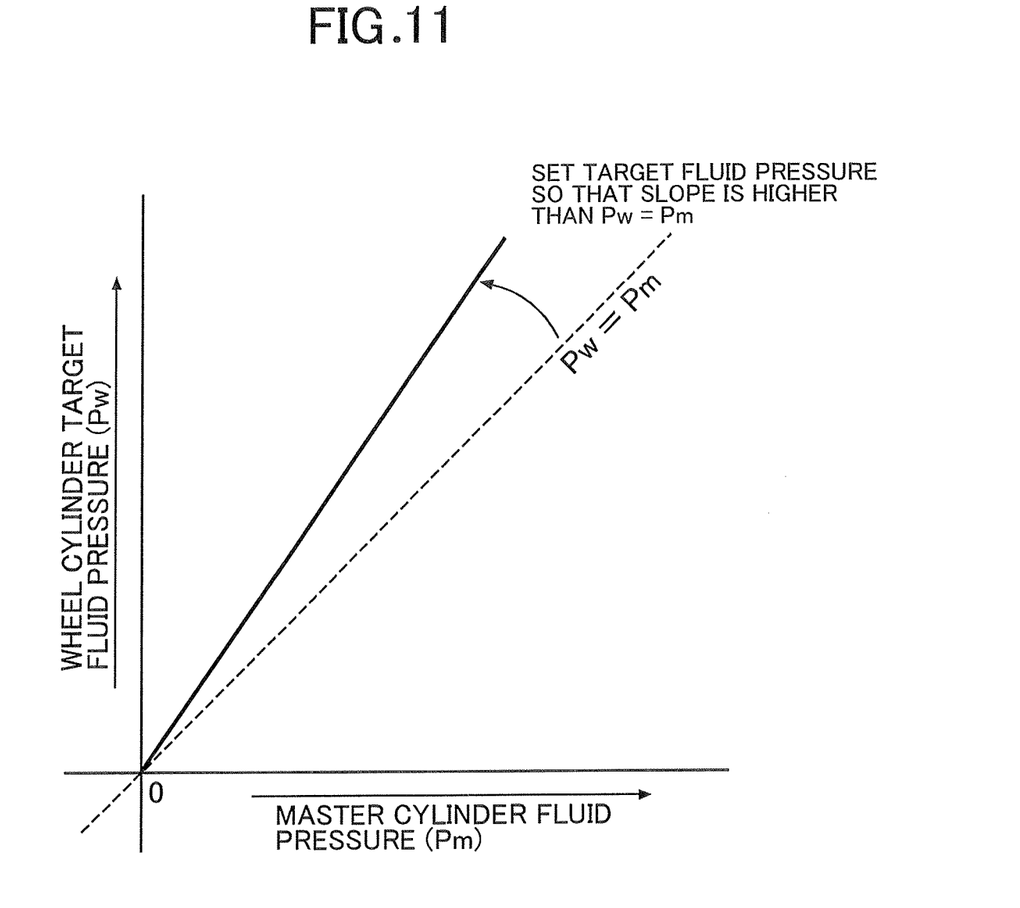
FIG. 11 is a diagram showing a method for setting a target fluid pressure. (first embodiment)

That is, in step S11 a target fluid pressure for the front wheel is calculated; if in step S12 the actual fluid pressure of the front wheel is less than the target fluid pressure for the front wheel, then in step S13 the hydraulic pumps 55 and 55 are operated, the in-valves 52 of the front wheels are opened, and the out-valves 54 of the rear wheels are closed (see FIG. 10). The brake fluid of the wheel cylinders 27; 31 of the rear wheels is thereby discharged to the reservoirs 53 and 53 side, the brake fluid is increased in pressure by the hydraulic pumps 55 and 55 and supplied to the wheel cylinders 26, 30 of the front wheels, and the braking force of the rear wheels is thus decreased relative to the braking force of the front wheels, thus further increasing the braking force of the front wheels.

As hereinbefore described, in accordance with the present embodiment, when the slave cylinder 42 malfunctions, the brake fluid from the master cylinder 11 is charged in advance into the reservoirs 53 and 53; since the brake fluid within the reservoirs 53 and 53 can be increased in pressure by the hydraulic pumps 55 and 55 of the hydraulic modulator 23 and supplied to the wheel cylinders 26 and 27; 30 and 31, even if the hydraulic modulator 23 does not have a pressure increase function for the brake fluid pressure but has only a circulation function with a simpler structure, it is possible for the hydraulic modulator 23 to generate a brake fluid pressure that is higher than the brake fluid pressure that can be generated by the master cylinder 11 with the depressing force at that time, thereby generating a high braking force in the wheel cylinders 26 and 27; 30 and 31 without the driver increasing the depressing force applied to the brake pedal 12.

Figure 12:
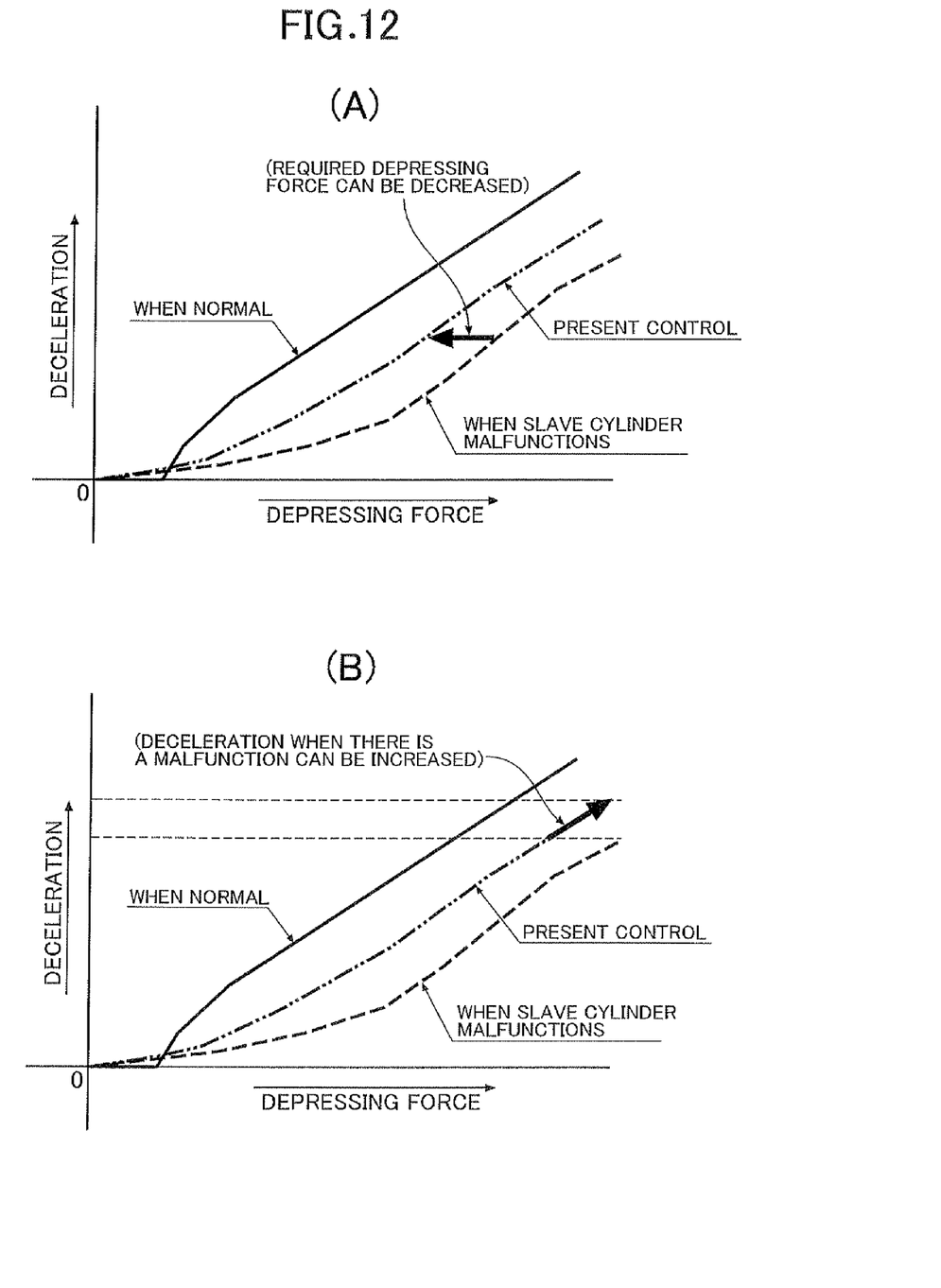
FIG. 12 is a diagram for explaining the effects of the embodiment. (first embodiment)

In FIG. 12 (A), the solid line shows the deceleration of braking by the slave cylinder 42 in a normal situation, the broken line shows the deceleration of conventional braking by the master cylinder 11 in an abnormal situation, and the chain line shows the deceleration of braking of the present embodiment in which the master cylinder 11 is cut off in an abnormal situation and the hydraulic modulator 23 is operated. From this figure, it can be seen that in accordance with the present embodiment, in an abnormal situation when the slave cylinder 42 is inoperable, the deceleration can be increased without greatly increasing the force with which the brake pedal 12 is depressed.

Furthermore, by discharging the brake fluid of the wheel cylinders 27; 31 of the rear wheels to the reservoirs 53 and 53 side, increasing the pressure of this brake fluid by the hydraulic pumps 55 and 55, and supplying it to the wheel cylinders 26, 30 of the front wheels, it is possible to increase the brake fluid pressure transmitted to the wheel cylinders 26, 30 of the front wheels, where a large braking force is required, by use of the brake fluid pressure transmitted to the wheel cylinders 27, 31 of the rear wheels, where only a small braking force is required, and to appropriately set the distribution of braking force between the front wheels and the rear wheels to obtain a greater deceleration.

As shown by the broken line in FIG. 12 (B), it can be seen that supplying the brake fluid of the wheel cylinders 27 and 31 of the rear wheels, which have a small brake factor, to the wheel cylinders 26 and 30 of the front wheels, which have a large brake factor, via the hydraulic pumps 55 and 55 increases the maximum deceleration that can be generated.

A mode for carrying out the present invention is explained above, but the present invention may be modified in a variety of ways as long as the modifications do not depart from the spirit and scope thereof For example, the slave cylinder 42 of the embodiment is only equipped with the single fluid pressure chamber 50, but it may be equipped with two fluid pressure chambers so as to correspond to the first and second lines.

Furthermore, in the embodiment, the wheel cylinders 26 and 27 of the left front wheel and the right rear wheel are defined as the first line, and the wheel cylinders 30 and 31 of the right front wheel and the left rear wheel are defined as the second line, but there are no restrictions with regard to this.

The invention claimed is:

1. A vehicle brake device comprising:
a master cylinder that is operated by a brake pedal to generate brake fluid pressure,
a stroke simulator into which can be introduced brake fluid from the master cylinder,
a simulator valve disposed between the master cylinder and the stroke simulator,
a fluid path that provides a connection between the master cylinder and a wheel cylinder, a slave cylinder that is connected to the fluid path and generates brake fluid pressure by the driving force of an actuator, a master cut valve that is disposed in the fluid path on an upstream side relative to the slave cylinder and can block the connection between the master cylinder and the wheel cylinder, and a hydraulic modulator that is disposed in the fluid path on a downstream side relative to the slave cylinder, the hydraulic modulator comprising:

a hydraulic pump that can increase the pressure of the brake fluid of a reservoir and supply the brake fluid to the fluid path, an in-valve that is disposed between the slave cylinder, the hydraulic pump, and the wheel cylinder, and an out-valve that is disposed between the wheel cylinder and the reservoir, and when there is an abnormality of the slave cylinder, control means closes the simulator valve and opens the master cut valve, the in-valve, and the out-valve to thus enable the brake fluid to be transferred from the master cylinder to the reservoir.

2. The vehicle brake device according to claim 1, wherein the device comprises amount of operation detection means for detecting an amount of operation of the brake pedal, the control means closing the master cut valve when the amount of operation of the brake pedal detected by the amount of operation detection means attains a predetermined value when there is an abnormality of the slave cylinder.

3. The vehicle brake device according to claim 1, wherein the in-valve and the out-valve are provided so as to correspond to at least two wheel cylinders, and the control means closes the in-valve and opens the out-valve of one wheel cylinder and opens the in-valve and closes the out-valve of the other wheel cylinder to thus supply the brake fluid of said one wheel cylinder side to said other wheel cylinder side via the hydraulic pump.

4. The vehicle brake device according to claim 2, wherein the control means opens the simulator valve again after closing the master cut valve.

5. A method for controlling a vehicle brake device comprising:

a master cylinder that is operated by a brake pedal to generate brake fluid pressure, a stroke simulator into which can be introduced brake fluid from the master cylinder, a simulator valve disposed between the master cylinder and the stroke simulator, a fluid path that provides a connection between the master cylinder and a wheel cylinder, a slave cylinder that is connected to the fluid path and generates brake fluid pressure by the driving force of an actuator, a master cut valve that is disposed in the fluid path on an upstream side relative to the slave cylinder and can block the connection between the master cylinder and the wheel cylinder, and a hydraulic modulator that is disposed in the fluid path on a downstream side relative to the slave cylinder, the hydraulic modulator comprising:

a hydraulic pump that can increase the pressure of the brake fluid of a reservoir and supply the brake fluid to the fluid path, an in-valve that is disposed between the slave cylinder, the hydraulic pump, and the wheel cylinder, and an out-valve that is disposed between the wheel cylinder and the reservoir, the method comprising:

a first step of closing the simulator valve when there is an abnormality of the slave cylinder, a second step of opening the master cut valve, the in-valve, and the out-valve, a third step of closing the master cut valve when an amount of operation of the brake pedal attains a predetermined value, and a fourth step of driving the hydraulic pump to operate the wheel cylinder.

6. The vehicle brake device control method according to claim 5, wherein the in-valve and the out-valve each are provided so as to correspond to at least two wheel cylinders, and in the fourth step, the in-valve of one wheel cylinder is closed, the out-valve thereof is opened, the in-valve of the other wheel cylinder is opened, and the out-valve thereof is closed.

7. The vehicle brake device control method according to claim 5, wherein in the fourth step the simulator valve is opened again.

8. The vehicle brake device according to claim 2, wherein the in-valve and the out-valve are provided so as to correspond to at least two wheel cylinders, and the control means closes the in-valve and opens the out-valve of one wheel cylinder and opens the in-valve and closes the out-valve of the other wheel cylinder to thus supply the brake fluid of said one wheel cylinder side to said other wheel cylinder side via the hydraulic pump.

9. The vehicle brake device control method according to claim 6, wherein in the fourth step the simulator valve is opened again.

* * * * *